(12) United States Patent
De Bijl et al.

(10) Patent No.: US 12,004,552 B2
(45) Date of Patent: Jun. 11, 2024

(54) MOULD MEMBER WITH FOREIGN OBJECT DETECTION

(71) Applicant: GEA FOOD SOLUTIONS BAKEL B.V., Bakel (NL)

(72) Inventors: Andreas Leonardus De Bijl, Den Dungen (NL); Paulus Johannes Verbruggen, Helmond (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 800 days.

(21) Appl. No.: 17/057,829

(22) PCT Filed: May 28, 2019

(86) PCT No.: PCT/EP2019/063758
§ 371 (c)(1),
(2) Date: Nov. 23, 2020

(87) PCT Pub. No.: WO2019/229038
PCT Pub. Date: Dec. 5, 2019

(65) Prior Publication Data
US 2021/0212354 A1    Jul. 15, 2021

(30) Foreign Application Priority Data
May 28, 2018  (EP) .................................. 18174628

(51) Int. Cl.
*A23P 30/10* (2016.01)
*A22C 7/00* (2006.01)

(52) U.S. Cl.
CPC ............ *A23P 30/10* (2016.08); *A22C 7/0038* (2013.01)

(58) Field of Classification Search
None
See application file for complete search history.

(56) References Cited

U.S. PATENT DOCUMENTS

| 2014/0212558 A1 | 7/2014 | Spierts et al. |
| 2014/0342072 A1 | 11/2014 | Van Gerwen |
| 2016/0205954 A1 | 7/2016 | Lindee et al. |

FOREIGN PATENT DOCUMENTS

| CN | 104244722 A | 12/2014 |
| CN | 105899080 A | 8/2016 |
| EP | 1760458 | 3/2007 |
| JP | H039252 A | 1/1991 |
| WO | 2012/173482 A1 | 12/2012 |
| WO | 2018/111108 A2 | 6/2018 |
| WO | 2018/117831 A1 | 6/2018 |
| WO | 2019/229038 A2 | 12/2019 |

OTHER PUBLICATIONS

Chinese Office Action dated Nov. 11, 2021, for Chinese Application 201980036117.6.
Chinese Office Action dated Jul. 19, 2022, for Chinese Patent Application No. 2019800361176.
International Search Report and Written Opinion for International Application PCT/EP2019/063758, dated Nov. 26, 2019.

*Primary Examiner* — Jyoti Chawla
(74) *Attorney, Agent, or Firm* — The Dobrusin Law Firm, P.C.

(57) ABSTRACT

A method of moulding products from a mass of food stuff. The method includes providing a pump, which pumps the mass towards a mould member, providing detection means, which detects unwanted objects in the mass, removing a portion of the mass via a valve in case an unwanted object is detected, moving a mould cavity, which is part of the mould member past a feed channel, wherein the feed channel is connected to a feed pump, filling the mass into the mould cavity to form a product until a predetermined filling pressure is reached, ejecting a gas through a porous sidewall and/or a porous bottom of the mould cavity to eject the product, wherein no ejection gas is provided when the predetermined filling pressure has not been reached.

20 Claims, 1 Drawing Sheet

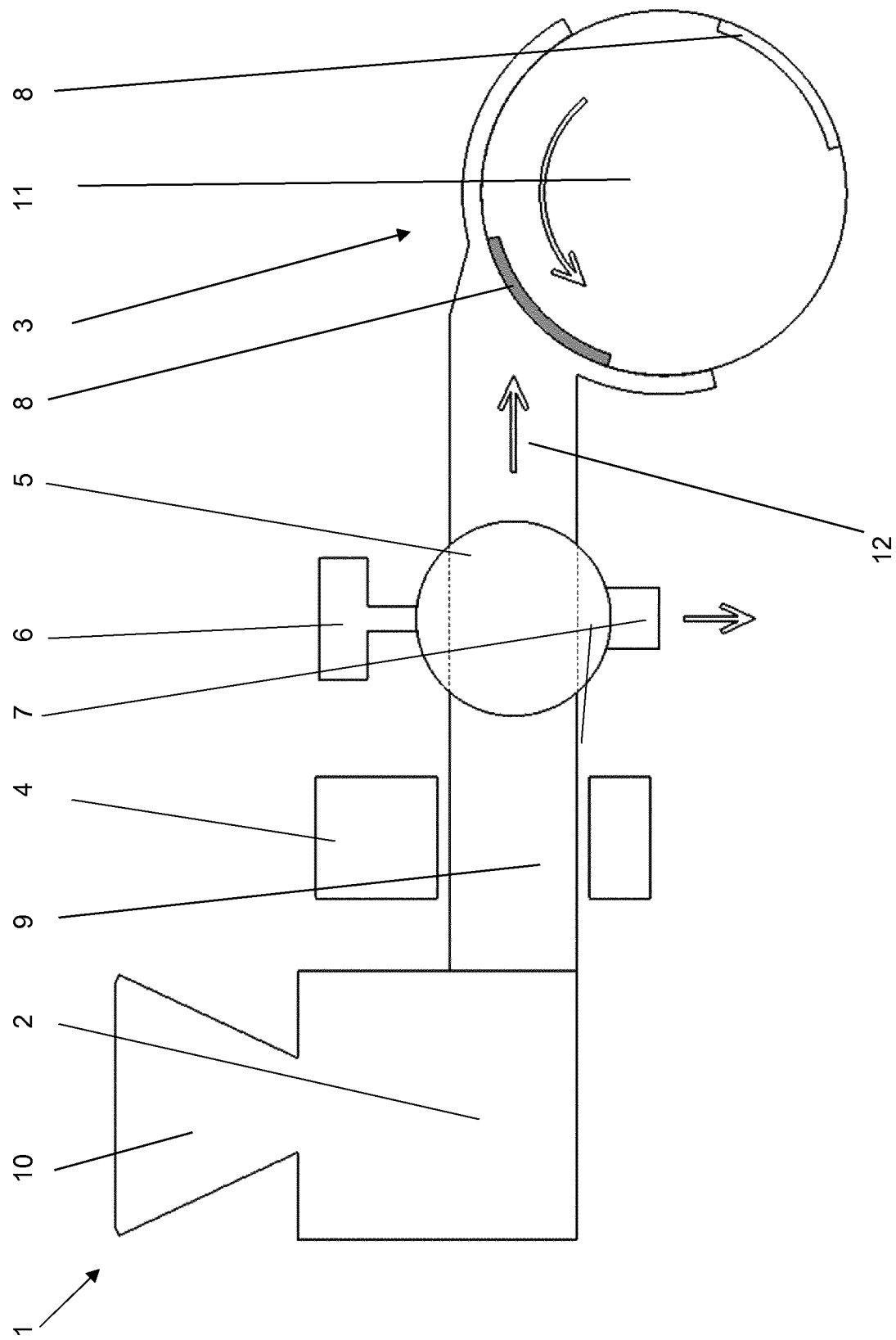

MOULD MEMBER WITH FOREIGN OBJECT DETECTION

FIELD

This invention relates to a method for moulding products from a mass of food stuff

BACKGROUND

This method is well known from the state of the art and can be utilized to fill cavities in a mould member, which mould member will be used to form food articles, for example out of meat-, fish- or vegetable-mass. This mould member can be a plate, which reciprocates linearly between two positions, or a rotating drum. Sometime there can be an unwanted object in the food mass, which may be harmful for human consumption and/or may damage the mould member. From the state in the art, it is therefore known to provide detection means to identify those objects and remove them before they reach the mould member. However, the methods from the state in the art have the disadvantage, that after the removal of an object, at least one often more cavities are not filled entirely, so that the resulting products are waste.

SUMMARY

It is the objective of the present invention to improve the method for moulding products from a food mass known from the state of the art.

This objective is achieved with a method for moulding products from a mass of food stuff, comprising:
providing a pump, which pumps a mass towards a mould member, which comprises a multitude of mould cavities,
providing detection means, which detects unwanted objects in the mass,
removing a portion of the mass via a valve in case an unwanted object is detected,
moving a mould cavity, which is part of a mould member past a feed channel, wherein the feed channel is connected to a feed pump,
filling the mass into the cavity to form a product until a predetermined filling pressure is reached and
ejecting a gas through a porous sidewall and/or a porous bottom of the cavity to eject the product,
wherein no ejection gas is provided in case the predetermined filling pressure has not been reached.

The inventive method allows to remove unwanted particles, like bones, plastic- or metal-parts from a food mass from which products like patties are produced. Hence, the consumer of the products are not harmed and/or the mould members are not damaged. The inventive method further assures that all cavities of the mould member are completely filled even after the unwanted objects have been removed from the mass, so that no waste occurs.

The disclosure made for this embodiment of the present invention also applies to and can be connected with the other embodiments of the present invention and vice versa. Subject matter disclosed regarding this embodiment of the preset invention can also be combined with other embodiments of the present invention.

The present invention is related to a method to mould products from a mass of food stuff. The method can be utilized for processing meat, fish, potatoes and vegetables like spinach or a combination thereof. The foodstuff can be crushed and/or comprise larger pieces, like muscles or filets. The inventive method is especially suitable for processing delicate and easily damaged products such as high-quality whole muscle meat products.

The method is based on a system comprising a feed pump, preferably a positive displacement pump, and a mould member, preferably a rotating mould drum or a reciprocating plate, comprising cavities with each a porous sidewall and/or a porous bottom. The feed pump is preferably but not limited to a positive displacement pump with a rotor. The feed pump pumps the food mass for example from a hopper into the cavities of the mould member in which the food mass is formed into the resulting food product, for example the patty. The mould member moves continuously or intermittently, preferably reciprocating movement from a filling- to a discharge position, in which the formed products are removed from the moulds, so that, in the filling position, they can be refilled again.

The mould member, preferably the mould drum, comprises mould cavities to form the products, which are at least partially made from a porous material, for example made from a sintered metal material. Each porous cavity is connected to a fluid passage, which more preferably extends in the longitudinal direction of the drum. During rotation of the drum from the discharge position to the fill position the cavities can preferably be filled with air. During filling of product in the product cavities, this air within the cavities will preferably be discharged through the porous walls of the at least partially porous cavities.

The mould member preferably comprises a multitude of mould cavities which cavities can be arranged in rows which can extend perpendicular to the direction of motion of the mould member, particularly parallel to the axis of rotation of the drum. In case the mould member is a drum, it consists in a preferred embodiment out of a, for example, stainless steel tube shaped element. To this tube-shaped element ribs can be applied which ribs provide rows in longitudinal direction of the drum. Elements of porous material, for example made from sintered stainless steel, can be positioned between the ribs. Every row should be provided with fluid passages which extend in longitudinal direction of the drum and which are located between the outer diameter of the tube shape element and the porous structure. During the filling of cavities, air entrapped in the cavities can escape via the walls of the cavities and the surrounding porous structure and via the passages out of the drum. During the discharge of formed products fluid will flow via a pressure source through the passage and through the porous structure to the cavities. This flow of fluid will eliminate the adhesion forces between the formed product and the cavity walls with result that the formed product will be discharged on for example a belt. To prevent that during discharge of formed products out of the cavities the fluid will flow to adjacent rows, reference can be made to WO 2012107236 wherein drum designs and fluid flow through a mould drum are described.

The pump pumps the mass towards the mould member. Between the pump and the mould member, there is a pipe or the like through which the mass is pumped. The pipe or the like ends in a feed channel, which feeds the mass into cavities. The feed channel is preferably directly or indirectly sealed against the mould member. Preferably during filling the mould member moves past the feed channel. The feed channel preferably at least essentially extends over the width, or in case of a drum over the entire length of the drum. The pump is preferably connected to a control system. The controls system preferably controls the pumps such that the volume needed to fill one row of cavities is provided. Additionally or alternatively, the control system controls the pump such that, at least at the end of the filling, at least a certain filling pressure is reached in the cavities. Preferred is combination of both filling concepts. The pump provided a volume a certain volume of mass and then the pressure is increased until the desired filling pressure is reached. The filling pressure is preferably measured with one or more pressure sensors, which are preferably provided in and/or in the vicinity of the feed-channel, wherein the sensors are preferably distributed along the length of the feed-channel, preferably along the length of the drum.

Preferably between the pump and the feed channel, detection means, for example X-ray means are provided, which detect unwanted particles, like bones or particles in the mass. The detection system preferably automatically analyses whether the particles reduces the quality of the product or makes it even unconsumable and/or damages the mould member, particularly the structure of the porous material. After an undesired particle has been identified, preferably a control system follows and/or records the way of one or more undesired particles through the pipe or the like, so that the control system preferably knows at every instance where the undesired particle is within the pipe.

In the pipe or the like, a valve or an equivalent means is provided to remove the article from the pipe or the like. As soon as the unwanted particle is in the vicinity of the valve, the valve opens to remove the unwanted particle from the pipe and/or to block the connection to the feed channel. Hence, the mass-volume which comprises the undesired particle is removed from the pipe. For example, as waste.

The production of formed products preferably continues until or shortly before the valve is opened. Alternatively or additionally, the production is preferably continued, until the filling pressure drops below a desired level. Thereafter, the mould member preferably continues its movement. In case of a drum, the drum preferably keeps rotating after the removal has been opened and while the valve is open. A provided control system preferably determines and/or stores the movement of the mould member, particularly the rotational position of the drum and thereby determines which row of cavities has not been entirely filled and/or at which row of cavities, the desired filling pressure has not been reached. The rotational position of these rows is determined and/or followed and when this row of this/these row(s) is determined and/or followed and when the respective not completely filled row of cavities reaches the discharge position, the ejection of gas, preferably air is not activated, so that the products remain in the cavities an approach the filling position again.

As soon as the discharge of the mass with the unwanted object is completed, the valve or the equivalent means are brought back into their original position, their production position and the production is recommenced. This is preferably carried out by increasing the pressure in the pipe of the like to a desired level, which is preferably higher than the filling pressure under normal conditions. As soon as this pressure level is reached during filling, this is registered by the control system and the ejection mechanism of the formed products is activated. In a preferred embodiment the ejection of formed products is, as soon as the pressure level is reached, activated after a predetermined time period and/or after a predetermined number of rows has passed the feed channel and/or discharge location.

When cavities or rows of cavities which have not entirely been filled or whose filling pressure was not high enough pass the filling channel again, their filling can be completed in case the filling pressure of the mass is high enough. If not, they will again be moved past the filling channel. This can be repeated as often as needed. Only after the filling pressure in the cavities is high enough, the discharge of the formed products from the mould member will be initiated.

Preferably, the mould member comprises a multitude of rows of cavities, wherein each row preferably comprises a multitude of cavities, which are filled simultaneously. The rows are preferably provided adjacent to each other, preferably equidistantly. In case of a drum, the rows extend parallel to the axis of rotation of the drum and at the surface of the drum.

According to a preferred or inventive embodiment of the present invention, the detection means is provided between the pump and the valve and that the position of the unwanted particle on its way towards the valve is known.

The disclosure made for this embodiment of the present invention also applies to and can be connected with the other embodiments of the present invention and vice versa. Subject matter disclosed regarding this embodiment of the preset invention can also be combined with other embodiments of the present invention.

After an undesired particle has been identified, a control system follows and/or records the way of one or more undesired particles through the pipe or the like, so that the control system preferably knows at every instance where the undesired particle is within the pipe. Hence, the valve or the equivalent means by which the unwanted object is removed from the system can be maintained in its production position until the object is in its vicinity. Only then it is opened. Consequently, the production is only interrupted shortly for the removal of the unwanted object and/or, the wasted mass is minimized.

According to a preferred embodiment of the present invention, the filling of the cavities continues until the unwanted particle has reached the vicinity upstream of the valve. Then, the valve or the equivalent means are transferred into their removal position, which will result in a pressure drop in the pipe and/or in the feed channel. As soon as the pressure drops below the desired value, incomplete filling is assumed by the control system and the product in this/these rows will not be discharged from the mould member but be brought back to the filling area to complete their filling, e.g. achieve the desired filling pressure in the cavities and/or in the filling channel. Consequently, according to this preferred embodiment of the present invention, the discharge of products from the mould member is stopped when or shortly before the unwanted particle is in the vicinity of the valve. It is resumed when the desired filling pressure or an exceeding pressure is reached.

Preferably, the movement of the mould member remains unchanged. In case of a drum, the drum preferably rotates with a constant speed regardless whether products are discharged or not.

Preferably, a predetermined volume of mass is discharged via valve.

The discharge of the mass with the unwanted object preferably starts before it has reached the valve or the equivalent discharge means. More preferably, the discharge continues after the unwanted object has already left the pipe or the like.

According to a preferred embodiment of the present invention, the pressure in feed channel upstream from the mould member and preferably downstream from the valve is increased after the discharge of the unwanted object, preferably until the predetermined filling pressure or a slightly higher filling pressure is reached. During this increase, the movement of the mould member preferably remains unchanged.

Preferably after the desired pressure in the feed channel is reached again after the discharge of the unwanted object, a controlled filling of the cavities, preferably via volume-pressure-control is reestablished.

Preferably, a control system is provided which controls the pump, the motion of the mould member, a control valve for the gas and/or the valve for the discharge of the unwanted object. According to this preferred embodiment of the present invention, a control system is controlling the pump, e.g. the pressure provided by the pump and/or the volume flow rate of the mass and/or the volume of the mass. The control system preferably controls the pump such that a certain volume of mass is provided, preferably the mass needed to fill one row of cavities. During and/or shortly afterwards, the pressure provided by the pump is preferably increased, until the filling pressure in the cavities is reached. During this increase in pressure, the mass in the cavities is compressed. After the cavities have been filled, the pressure provided by the pump is preferably lowered again. The pump is preferably controlled depending on the movement of the mould member. In case the movement of the mould member is continuous, according to the speed of movement of the mould member, e.g. the speed of rotation of the drum. A valve for the discharge of a gas to remove the product from the cavity is preferably controlled according to the rotational position of the drum and the status of the discharge valve for the unwanted object.

Under normal operation conditions, the valve for the gas is opened in case a row of cavities is in the discharge position. However, in case the valve for the unwanted object is in the discharge status and/or if the filling pressure in a certain row of cavities has not been reached, the valve for the gas remains preferably closed, so that rows with not completely filled cavities are not emptied but completed when they pass the filling position again. The valve for the discharge of the unwanted object is preferably controlled according to the detection of the unwanted object and its movement in the pipe. Preferably, this valve remains in the discharge status until a certain volume of mass has been discharged.

The desired pressure provided by the pump is preferably increased to fill the cavity with the mass and then decreased while or after the cavity has been filled based on the position of the mould cavity relative to the feed channel.

According to a preferred embodiment, the method comprises the following steps:
  determining and/or detecting the position of the mould cavity relative to the feed channel and
  controlling of the pump according to the position of the mould member.

According to a preferred embodiment, the method comprises the following steps:
  determining and/or detecting the position of the mould cavity relative to an exit-position and
  controlling of the gas ejection according to the position of the mould member.

Preferably, the formed products are placed on conveyor means, for example a belt after they have been discharged from the mould member. The conveyor belt is preferably synchronized with the movement of the mould member. Preferably, the movement of the conveyor means remains, preferably constant, even if no products are discharged.

Preferably, gas in the product, for example air, can be removed from the product, for example by vacuum, for example through the porous material and via the fluid passage, for example to the ambient.

BRIEF DESCRIPTION OF THE DRAWINGS

The inventions are now explained according to the only FIG. 1. The explanations do not limit the scope of protection. The explanation applies to all embodiments of the present invention likewise.

FIG. 1 shows a food forming apparatus in combination with a mass supply system.

DETAILED DESCRIPTION

FIG. 1 shows a food mass supply system 1 comprising a pump system 2 and preferably a hopper. The pump 2 is connected via a pipe 9 or the like (in the following "pipe 9") to the feed means 12 of a forming apparatus 3. The forming apparatus 3 is here provided as a mould drum 11 comprising a multitude of mould cavities 8, each being at least partially made from porous material. The porous material of the cavities is connected to a channel through which the cavities can be vented during filling and through which gas can be ejected when the cavity to be emptied is in the discharge position. The feed means 12 comprises a feed channel through which the mass to be formed is pumped into the cavities and a seal around the feed channel is preferably used to reduce/prevent leakage of food mass to the ambient. The mould drum rotates around an axis, here counter-clockwise as depicted by the arrow, and the cavities 8 are filled in a filling position, here the eleven o'clock-position, with the food mass which is pressed into the cavities 8. In a discharge position, for example the six o'clock-position, the formed products are discharged, here on a transportation belt (not depicted). The discharge is being executed by ejecting a gas, preferably air, through the porous material. During filling, the cavities can be vented through the same porous material. The person skilled in the art understands that the mould member can also be a reciprocating mould plate.

In and/or at the pipe 9, preferably downstream from the pump 2, detection means 4 are provided to detect unwanted particles in the food mass. Such unwanted particles can for example cause harm to the consumer and/or damage the system 1, particularly the mould member 11 and here the porous structure of the cavities. The detection means is for example an X-ray and/or a metal detector. Furthermore, upstream from the forming apparatus and downstream from the detection means 4, the pipe 9 comprises a valve 5 and/or equivalent removal means (in the following "valve 5") to remove the part of the mass which comprises the unwanted particle from the system. The valve 5 is preferably an automatic valve, which is actuated by a motor 6, which is preferably connected to a control system which controls the operation of the forming line. In case the detection means detect an unwanted particle, the valve is transferred from a production position to a discharge position, preferably when the unwanted particle is the vicinity of the valve 5 or even in the valve 5. A certain volume, preferably a preset volume is then discharged from the pipe 9 via exit 7 and then the valve 5 is transferred back to the operation position.

The above-mentioned control system (not depicted), preferably controls the pump, more preferably the volume flow rate and/or the pressure provided by the pump 2 depending on the speed of motion of the mould member 11 and/or production capacity of the drum. Preferably, the control system comprises means to determine the actual position of the mould member and/or its movement-pattern. In case of a drum, the means determine the actual angular position of a cavity, so that the control system for example knows when a particular cavity 8 is in the filling- and/or the discharge-position. The control system preferably activates the gas-discharge in case a completely filled cavity is in the discharge position. In case a cavity is not completely filled, the cavity will not be emptied but rotated back filling position to complete the filling of the cavities, particularly until a desired filling pressure in the cavities has been reached. The control system preferably also comprises means to follow the motion and/or position of an unwanted particle downstream from the detection means. This can be done by calculation and/or measurement, preferably to determine when the unwanted particle is in the vicinity of the valve 5 or even in the valve 5 to reduce the discharged mass and the loss of production to a minimum. The control system is preferably connected to a pressure measurement means, which is preferably located downstream from the valve 5 more preferably located in the feed channel of the feed means 12. The measurement means preferably determine whether the filling pressure has been reached at the end of the filling-process of a cavity. Based on this measurement, the control system preferably decides, whether a product is discharged from the cavity or not.

In case, an unwanted particle is determined, the detection means provide a signal, which is then sent to the control system. The signal comprises for example information about the beginning and the end of the food mass string in which an unwanted particle has been detected. The control system then preferably determines when the beginning of the food mass string is in the vicinity of the valve 5 and then opens the valve so that the food mass string comprising the unwanted particle is discharged via exit 7. As soon as the unwanted particle(s) have been discharged or some additional food mass, the valve is closed again and normal production can resume.

The production of formed products continues even after an unwanted particle has been detected. As soon as the valve 5 is opened or shorty after, the filling pressure in the filling channel will decrease, which will result in no completely formed products, which do not meet the required quality standard. The control system recognizes the pressure drop and will consequently remain a valve in the gas line for the product discharge closed until the filling pressure is measured again at the end of the filling cycle of a cavity. Until then, the cavities pass the discharge position unemptied.

In order to resume the production of completely filled cavities as fast as possible after a discharge of unwanted particles, the desired filling pressure may be automatically increased above the set level for a certain period of time.

LIST OF REFERENCE SIGNS

1 System, mass supply system
2 Pump
3 Forming apparatus
4 Detection means, X-ray, Metal Detector
5 Valve and/or equivalent removal means
6 Valve actuator
7 Exit, valve exit
8 Mould cavities
9 Pipe
10 Hopper
11 Mould member, mould drum
12 Feed means

The invention claimed is:

1. A method of moulding products from a mass of food stuff, comprising:
providing a pump, which pumps the mass towards a mould member,
providing detection means, which detects unwanted objects in the mass,
removing a portion of the mass via a valve in case an unwanted object is detected, the valve is located in region between the detection means and the mould member,
moving a mould cavity, which is part of the mould member, past a feed channel, wherein the feed channel is connected to a feed pump,
filling the mass into the mould cavity to form a product until a predetermined filling pressure is reached,
ejecting a gas through a porous sidewall and/or a porous bottom of the mould cavity to eject the product,
wherein no ejection gas is provided when the predetermined filling pressure has not been reached after the removing step so that the product is not ejected from the mould cavity.

2. The method according to claim 1, wherein the mould member comprises a multitude of rows, and each of the rows comprises a multitude of cavities, which are filled simultaneously.

3. The method according to claim 2, wherein the cavities are filled such that the pump delivers an approximately needed volume to fill one row of the cavities simultaneously and that the filling pressure is then increased until the predetermined filling pressure is reached.

4. The method according to claim 1, wherein the detection means is provided between the pump and the valve and a position of the unwanted on its way towards the valve is known.

5. The method according to claim 4, wherein the filling of the mould cavity continues until the unwanted object has reached a vicinity upstream of the valve.

6. The method according to claim 4, wherein a discharge of the product from the mould member is stopped when the unwanted object is in a vicinity of the valve and that the valve is opened.

7. The method according to claim 6, wherein movement of the mould member remains unchanged during the ejecting and the step of not providing the ejection gas.

8. The method according to claim 1, wherein a predetermined volume of the mass is discharged via the valve.

9. The method according to claim 1, wherein a pressure in the feed channel upstream from the mould member and downstream from the valve is increased after a discharge of the unwanted object, until the predetermined filling pressure or a slightly higher filling pressure is reached.

10. The method according to claim 1, wherein a control system is provided which controls the pump, a motion of the mould member, a control valve for the gas and/or the valve.

11. The method according to claim 1, wherein the predetermined filling pressure provided by the pump is increased to fill the mould cavity with the mass and then decreased while or after the mould cavity has been filled based on a position of the mould cavity relative to the feed channel.

12. The method according to claim 1, comprising: determining and/or detecting a position of the mould cavity relative to the feed channel, and controlling of the pump according to the position of the mould member.

13. The method according to claim 1, comprising: determining and/or detecting a position of the mould cavity relative to an exit-position, and controlling of the ejection gas according to the position of the mould member.

14. The method according to claim 1, wherein the formed products are placed on conveyor means.

15. The method according to claim 1, wherein after the valve is opened to remove the portion of the mass if the unwanted object is detected in the mass, a valve configured to eject the gas through the mould cavity remains closed or will be closed until after the predetermined filling pressure in the mould cavity is reached.

16. The method according to claim 1, wherein the filing step takes place when the mould cavity is in a filing position, and after the step of not ejecting the gas, the mould cavity is rotated back to the filling position to complete the filing step until the predetermined filling pressure is reached.

17. The method according to claim 1, wherein after the removing step, a filling pressure is increased to a level higher than the predetermined filling pressure, and wherein the mould member is configured to rotate at a constant speed during the ejecting and not ejecting steps.

18. The method according to claim 1, wherein a control system is configured to follow and/or record the unwanted object until the unwanted object is in a vicinity of the valve and then the method comprises opening the valve to remove the unwanted object.

19. A method of moulding products from a mass of food stuff, comprising:
pumping the mass with a pump towards a mould member;
detecting an unwanted object in the mass with a detection means;
removing the unwanted object and a portion of the mass with a valve, the valve is located between the detection means and the mould member;
moving a mould cavity of a mould member past a feed channel;
filling the mass into the mould cavity to form a product;
determining if a predetermined filling pressure in the mould cavity has been reached;
wherein when the mould cavity is in a discharge position, the method comprises:
  i) ejecting a gas through a porous sidewall and/or a porous bottom of the mould cavity to eject the product from the mould cavity if the predetermined filling pressure is reached, or
  ii) not ejecting the gas through the porous sidewall and/or the porous bottom of the mould cavity so that the product is not ejected from the mould cavity if the predetermined filling pressure is not reached after the removing step;
wherein the filing step takes place when the mould cavity is in a filing position, and after the step of not ejecting the gas, the mould cavity is rotated back to the filling position until the predetermined filling pressure is reached and then the ejecting step takes place after the mould cavity is moved into the discharge position.

20. The method according to claim 19, wherein the mould member is configured to rotate at a constant speed during the removing, filling, ejecting, and not ejecting steps.

* * * * *

UNITED STATES PATENT AND TRADEMARK OFFICE
CERTIFICATE OF CORRECTION

PATENT NO. : 12,004,552 B2
APPLICATION NO. : 17/057829
DATED : June 11, 2024
INVENTOR(S) : Andreas Leonardus De Bijl and Paulus Johannes Verbruggen It is certified that error appears in the above-identified patent and that said Letters Patent is hereby corrected as shown below:

In the Claims

Column 8, Line 35, Claim 4, insert --object-- after "of the unwanted", and before "on".

Signed and Sealed this
Thirtieth Day of July, 2024

Katherine Kelly Vidal
*Director of the United States Patent and Trademark Office*